United States Patent
Joyce

(10) Patent No.: US 8,418,554 B2
(45) Date of Patent: Apr. 16, 2013

(54) GYROSCOPE PACKAGING ASSEMBLY

(75) Inventor: Richard J. Joyce, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 12/475,963

(22) Filed: Jun. 1, 2009

(65) Prior Publication Data

US 2010/0300202 A1   Dec. 2, 2010

(51) Int. Cl.
*G01C 19/00* (2006.01)

(52) U.S. Cl.
USPC ........................................... 73/504.15

(58) Field of Classification Search ............... 73/504.15, 73/504.07–504.08
See application file for complete search history.

(56) References Cited

U.S. PATENT DOCUMENTS

| | | | |
|---|---|---|---|
| 5,894,090 A * | 4/1999 | Tang et al. | 73/504.02 |
| 6,032,531 A * | 3/2000 | Roszhart | 73/504.04 |
| 6,282,958 B1 | 9/2001 | Fell et al. | |
| 6,487,864 B1 * | 12/2002 | Platt et al. | 62/3.2 |
| 6,806,557 B2 * | 10/2004 | Ding | 257/659 |
| 6,944,931 B2 | 9/2005 | Shcheglov et al. | |
| 6,966,228 B2 * | 11/2005 | Binet et al. | 73/754 |
| 7,040,163 B2 | 5/2006 | Shcheglov et al. | |
| 7,068,126 B2 * | 6/2006 | Huang et al. | 333/186 |
| 7,312,674 B2 * | 12/2007 | Duwel et al. | 333/186 |
| 7,347,095 B2 | 3/2008 | Shcheglov et al. | |
| 7,401,397 B2 | 7/2008 | Shcheglov et al. | |
| 8,106,724 B1 * | 1/2012 | Wang et al. | 333/186 |
| 2003/0000306 A1 * | 1/2003 | Fell | 73/504.12 |
| 2007/0017287 A1 | 1/2007 | Kubena et al. | |
| 2008/0148846 A1 | 6/2008 | Whelan et al. | |
| 2008/0295622 A1 | 12/2008 | Challoner | |
| 2010/0024546 A1 | 2/2010 | Challoner et al. | |
| 2010/0181868 A1 * | 7/2010 | Gaidarzhy et al. | 310/313 B |
| 2010/0251818 A1 | 10/2010 | Ge et al. | |
| 2010/0300201 A1 | 12/2010 | Ge et al. | |

FOREIGN PATENT DOCUMENTS

| | | |
|---|---|---|
| EP | 1701132 A1 | 9/2006 |
| EP | 2040033 A1 | 3/2009 |
| GB | 2208318 A | 3/1989 |

OTHER PUBLICATIONS

PCT International Search Report, Aug. 20, 2010.

* cited by examiner

*Primary Examiner* — Max Noori

(74) *Attorney, Agent, or Firm* — Caven & Aghevli LLC

(57) ABSTRACT

Packaging techniques for planar resonator gyroscopes, such as disc resonator gyroscopes (DRGs) are disclosed. In one embodiment, a packaged resonator gyroscope comprises a carrier, a substrate layer mounted to the carrier, a baseplate coupled to the substrate to define a cavity between the substrate and the baseplate, and a resonator mounted to the baseplate and suspended in the cavity. Other embodiments may be described.

19 Claims, 8 Drawing Sheets

GYROSCOPE PACKAGING ASSEMBLY

RELATED APPLICATIONS

None

BACKGROUND

The subject matter described herein relates to gyroscopes, and in particular to planar resonator gyroscopes or inertial sensors and their manufacturing. More particularly, this invention relates to the packaging of resonator inertial sensors and gyroscopes.

Gyroscopes may be used to determine direction of a moving platform based upon the sensed inertial reaction of an internally moving proof mass. A typical electromechanical gyroscope comprises a suspended proof mass, gyroscope case, pickoffs, torquers and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that must be in close proximity to the proof mass are internally mounted to the case which also provides the electrical feedthrough connections to the platform electronics and power supply. The case also provides a standard mechanical interface to attach and align the gyroscope with the vehicle platform. In various forms gyroscopes are often employed as a sensor for vehicles such as aircraft and spacecraft. They are generally useful for navigation or whenever it is necessary to autonomously determine the orientation of a free object.

Conventional mechanical gyroscopes were heavy mechanisms employing relatively large spinning masses. A number of recent technologies have brought new forms of gyroscopes, including optical gyroscopes such as laser gyroscopes and fiberoptic gyroscopes as well as mechanical vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined vibratory gyroscopes (e.g. a Litton hemispherical resonator gyroscope inertial reference unit). However, both of these are very expensive, large and heavy.

Some symmetric vibratory gyroscopes have been produced, however their vibratory momentum is transferred through their cases directly to the vehicle platform. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. issued Apr. 13, 1999 and entitled "Silicon Bulk Micromachined, Symmetric, Degenerate Vibratory Gyroscope, Accelerometer and Sensor and Method for Using the Same", which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar silicon microfabrication. The hemispherical resonator employs the extensive cylindrical sides of the hemisphere for sensitive electrostatic sensors and effective actuators. However its high aspect ratio and three-dimensional curved geometry is unsuitable for inexpensive thin planar silicon microfabrication. The thin ring gyroscope (e.g., U.S. Pat. No. 6,282,958, issued Sep. 4, 2001 and entitled "Angular Rate Sensor" which is incorporated by reference herein) while suitable for planar silicon microfabrication, lacks electrostatic sensors and actuators that take advantage of the extensive planar area of the device. Moreover, the case for this gyroscope is not of the same material as the resonator proof mass so that the alignment of the pickoffs and torquers relative to the resonator proof mass change with temperature, resulting in gyroscope drift.

Recently, some planar resonator gyroscopes devices have been developed (such as a disc resonator gyroscope) which operate through the excitation and sensing of in-plane vibrational modes of a substantially solid planar resonator. These planar resonators obtain enhanced properties over designs such as the hemispherical or shell resonators by enabling greater drive and sensing area in a compact package that is more easily manufactured and packaged. For example, see U.S. Pat. No. 6,944,931 by Shcheglov et al., issued Sep. 20, 2005 and entitled "Method of Producing an Integral Resonator Sensor and Case" and U.S. Pat. No. 7,040,163 by Shcheglov et al., issued May 9, 2006 and entitled "ISOLATED PLANAR GYROSCOPE WITH INTERNAL RADIAL SENSING AND ACTUATION."

However, planar resonator gyroscopes employing embedded capacitive electrodes may be sensitive to distortions arising between their supporting baseplate and planar resonator. Any distortions can affect the capacitive gaps and thus render negative consequences to the operation of the gyroscope, such as damping asymmetry and/or rate drift. Thermal gradients between different structural elements of a planar resonator gyroscope can be a primary contributor to capacitive gap nonuniformity. Conventional microelectronics and microelectromechanical systems (MEMS) manufacturing techniques, which are commonly employed in the development of planar resonator gyroscopes, call for applying a bond across at least a portion of the MEMS die to the package substrate. This bond or the package is often a dissimilar material to the MEMS die which can lead to differential expansion versus temperature between the MEMS die and package substrate. In turn, this may result in induced mechanical stress, warpage of the die and internal electrode gap nonuniformity which affect the performance of the gyroscope.

In view of the foregoing, there is a need in the art for improved packaging structures and methods for planar resonator gyroscopes, such as with conventional MEMS packaging techniques. Particularly, there is a need for such structures and methods to reduce thermal expansion differentials, mechanical stress, warpage and capacitive gap nonuniformity. However, there is a need for such structures and methods to be compatible with existing manufacturing methods and materials for planar resonator gyroscopes. As detailed below, the present invention satisfies these and other needs.

SUMMARY

In various aspects, gyroscopes, and in particular planar resonator gyroscope packages and techniques for manufacturing such assemblies are provided. By way of example, a packaged resonator gyroscope and method to make the same are provided. In some embodiments, the packaged resonator gyroscope includes features to isolate the resonator from physical stress and/or thermal stress.

Thus, in one aspect there is provided a packaged resonator gyroscope. In one embodiment, the packaged resonator gyroscope comprises a carrier, a substrate mounted to the carrier, a baseplate coupled to the substrate to define a cavity between the substrate and the baseplate, and a resonator mounted to the baseplate and suspended in the cavity.

In another aspect there is provided a method of packaging a planar resonator gyroscope. In one embodiment, the method comprises mounting a planar resonator die comprising a planar resonator and a baseplate onto a substrate to define a cavity between the substrate and the baseplate, such that the resonator is suspended in the cavity, mounting the substrate to a carrier, and securing a cap to the carrier.

BRIEF DESCRIPTION OF THE DRAWINGS

The detailed description is described with reference to the accompanying figures.

DETAILED DESCRIPTION

Described herein are exemplary systems and methods to make and use gyroscope packaging assemblies. In some embodiments, a gyroscope packaging assemblies as described herein may be used to implement a microelectronic and mechanical systems (MEMS) gyroscope, which in turn may be used in conjunction with a wide variety of mechanical and electrical devices, e.g., a handheld device such as a remote controller, a motor vehicle, an airplane, a rocket, or the like.

Exemplary gyroscopes which may be used with a packaging assembly as described herein are described in the following documents, the disclosures of which are incorporated herein by reference in their entirety:

Co-pending U.S. patent application Ser. No. 12/416,911, filed Apr. 1, 2009, and entitled "Environmentally Robust Disc Resonator Gyroscope", by Howard H. Ge and A. Dorian Challoner.

Co-pending U.S. patent application Ser. No. 12/473,084, filed May 27, 2009, and entitled "Isolated Active Temperature Regulator for Vacuum Packaging of a Disk Resonator Gyroscope", by Howard H. Ge and A. Dorian Challoner U.S. Pat. No. 7,401,397, filed Mar. 9, 2006, and entitled "Method of Producing an Inertial Sensor", by Kirill V. Shcheglov et al.

U.S. Pat. No. 7,347,095, filed Aug. 8, 2005, and entitled "Integral Resonator Gyroscope", by Kirill V. Shcheglov et al.

U.S. patent application Ser. No. 11/458,911, (US20070017287A1) filed Jul. 20, 2006, and entitled Disc Resonator Gyroscopes.

U.S. patent application Ser. No. 11/757,395, (US20080295622A1) filed Jun. 4, 2007, and entitled Planar Resonator Gyroscope with Central Die Attachment.

U.S. patent application Ser. No. 11/615,872, (US 20080148846A1) filed Dec. 22, 2006, and entitled Vibratory Gyroscope with Parasitic Mode Dampening.

U.S. patent application Ser. No. 11/831,822, filed Dec. 22, 2006, and entitled Disc Resonator Integral Inertial Measurement Unit.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1A:
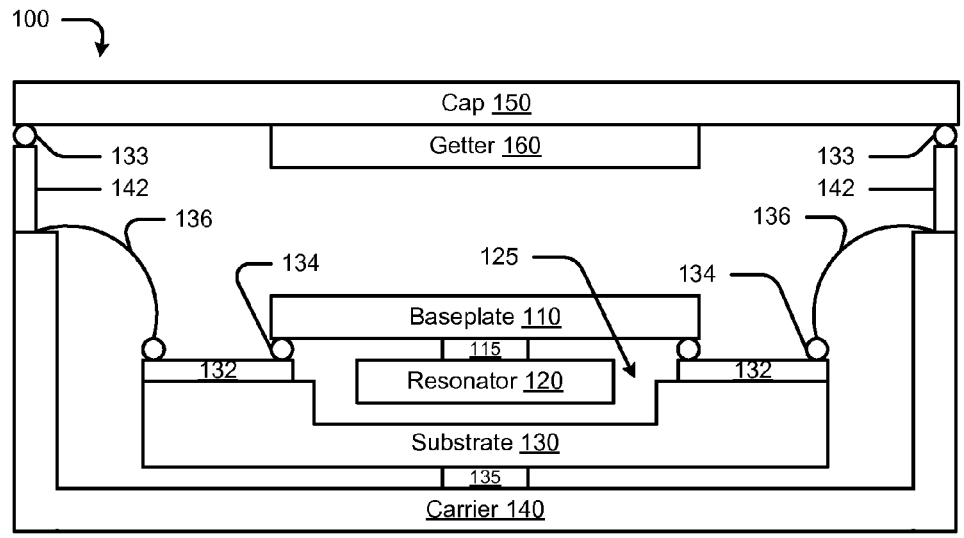
FIGS. 1A-1D are schematic cross-sectional illustrations of a gyroscope packaging assembly in accordance with some embodiments.

FIGS. 1A-1D are schematic cross-sectional illustrations of a gyroscope packaging assembly in accordance with some embodiments. Referring first to FIG. 1A, in brief, an exemplary gyroscope packaging assembly 100 comprises a carrier 140, a substrate 130 mounted to the carrier 140, a baseplate 110 coupled to the substrate 130 to define a cavity 125 between the substrate 130 and the baseplate 110, and a resonator 120 mounted to the baseplate 110 such that the resonator 120 is suspended in the cavity 125.

In some embodiments, resonator 120 may be embodied as a disc resonator gyroscope in accordance with the description provided in U.S. Patent Application Publication No. 20070017287, which is incorporated by reference herein. The baseplate 110 may be formed from silicon, quartz, or another suitable material. In the embodiment depicted in FIG. 1A, the resonator 120 is mounted to the baseplate 110 by a hard-mount 115, which may be embodied as a soldered section comprising gold, tin or a combination thereof.

Substrate 130 may be formed from silicon or another suitable material, and comprises one or more electrical interconnects 132, which may be implemented as circuit traces on a surface of substrate 130 or embedded within substrate 130. In the embodiment depicted in FIG. 1A an interior portion of substrate 130 has been removed by a suitable removal process, e.g., an etching process. Baseplate 110 is electrically coupled to the one or more electrical interconnects 132 via one or more electrically conductive connectors such as solder balls 134, which support base plate 110 such that resonator 120 is suspended in the cavity 125 defined by the removed portion of substrate 130.

In the embodiment depicted in FIG. 1A, substrate 130 is mounted to the carrier 140 110 by a hard-mount 135, which may be embodied as a soldered section comprising gold, tin or a combination thereof. One or more of the electrical interconnects 132 are coupled to a lead wire 136, which provides electrical contact with the substrate 130 through a wall section 142 of carrier 140. A cap 150 may be sealed to the carrier 140, e.g., a continuous seal ring 133 using a solder preform that is reflowed at an elevated temperature. A vacuum getter 160 may be coupled to the cap 150. In some embodiments, the vacuum getter may comprise a titanium-based thin film getter or any other getter material.

Figure 1B:
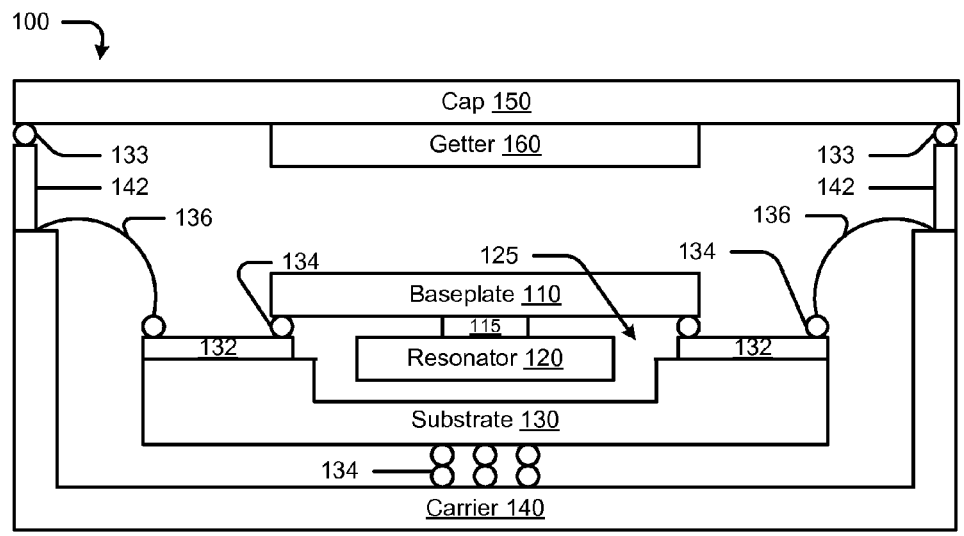

FIG. 1B is a schematic illustration of an alternate embodiment of a gyroscope packaging assembly 100. The assembly 100 depicted in FIG. 1B is similar to the assembly depicted in FIG. 1A. In the interest of brevity and clarity, the description of similar components will not be repeated. Referring now to the embodiment depicted in FIG. 1B, one or more solder balls 134 have replaced the hard mount 135 to support the substrate 130 on the carrier 140. In alternate embodiments, the solder balls 134 may be replaced by one or more pillars, or by gold balls that are thermocompression molded.

Figure 1C:
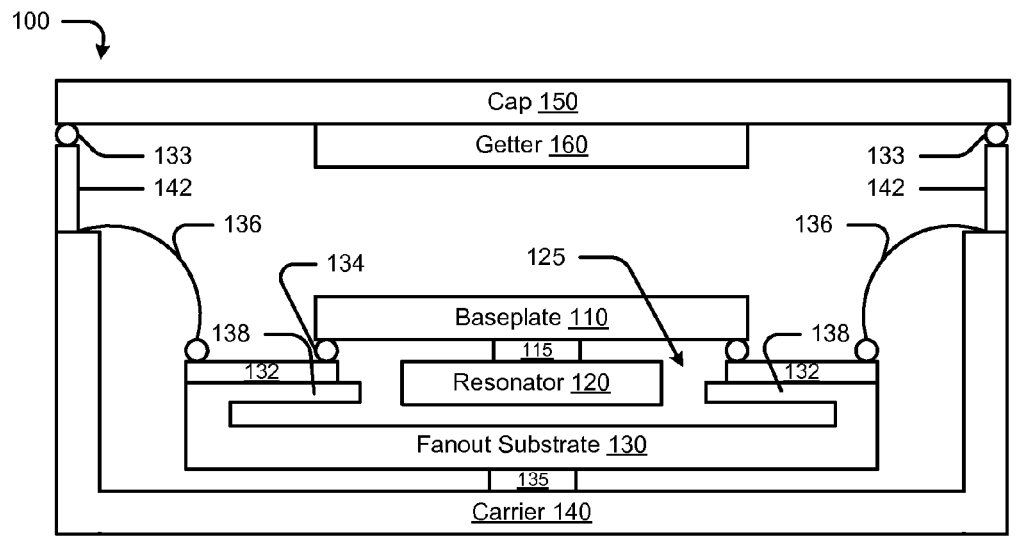

FIG. 1C is a schematic illustration of an alternate embodiment of a gyroscope packaging assembly 100. The assembly 100 depicted in FIG. 1C is similar to the assembly depicted in FIG. 1A. In the interest of brevity and clarity, the description of similar components will not be repeated. Referring now to the embodiment depicted in FIG. 1C, a portion of the substrate 130 has been removed, e.g., by a suitable etching process, to leave a plurality of flexible cantilevered sections 138 to which the baseplate 110 may be mounted. Cantilevered sections 138 provide an additional measure of vibration isolation to the baseplate 110 and the resonator 120.

Figure 1D:
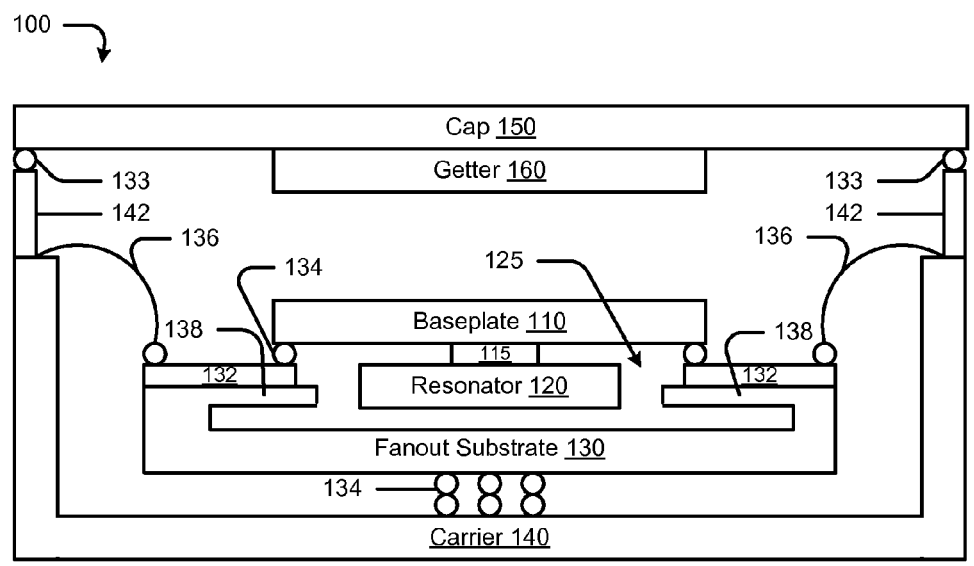

FIG. 1D is a schematic illustration of an alternate embodiment of a gyroscope packaging assembly 100. The assembly 100 depicted in FIG. 1D is similar to the assembly depicted in FIG. 1C. In the interest of brevity and clarity, the description of similar components will not be repeated. Referring now to the embodiment depicted in FIG. 1D, one or more solder balls 134 have replaced the hard mount 135 to support the substrate 130 on the carrier 140. In alternate embodiments, the solder balls 134 may be replaced by one or more pillars.

Thus, FIGS. 1A-1D provide schematic depictions of embodiments of gyroscope packaging assemblies in which the baseplate 110 is mounted on a substrate to define a cavity region, and the resonator is suspended from the baseplate in the cavity region. This construction enhances the physical and thermal stability of the package assembly 100. In addition, substrate 130 may have portions removed to define flexible cantilevered sections to provide additional physical and thermal stability. Still further, the substrate may be mounted to the carrier 140 using solder balls 134 to further isolate the substrate from the carrier 140. These construction techniques, alone or in combination, provide an enhanced thermal and physical stability of the package assembly 100.

Package assembly may further include one or more active thermal management elements to further enhance the physical and thermal stability of the package. By way of example and not limitation, one or more of the solder balls 138 may be implemented as a heat pump such as an active thermal copper pillar bump commercially available from Nextreme Thermal Solutions, Inc. of Durham, N.C., USA. In addition, a thermoelectric cooling module may be added to package 100.

Figure 2A:
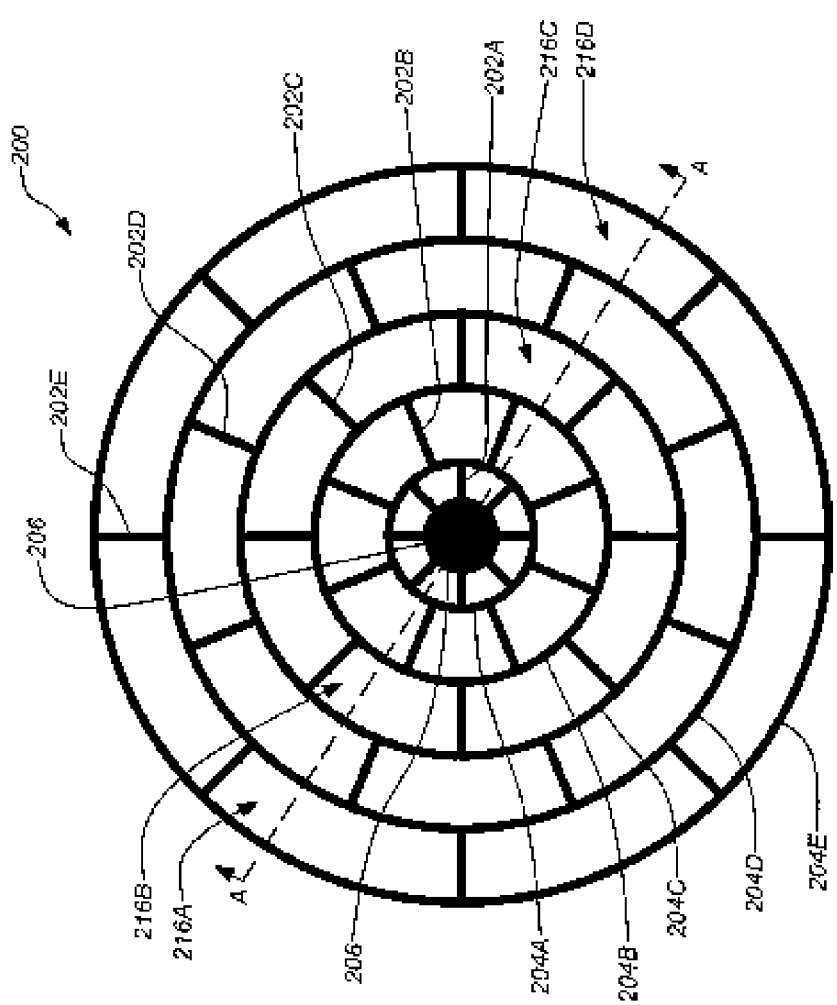
FIG. 2A is a schematic illustration of a top view of an isolated resonator for the gyroscope or inertial sensor which may be operated in accordance with some embodiments.

FIG. 2A is a schematic illustration of a top view of an isolated resonator for the gyroscope or inertial sensor which may be operated in accordance with some embodiments. The gyroscope comprises a unique planar resonator 200 which is supported by a rigid central support 206 and designed for in-plane vibration. In the exemplary embodiment, the resonator 200 comprises a disc that includes a number of slots, e.g. 216A-216D (generally referenced as 216) formed from concentric circumferential segments 204A-204E. The circumferential segments 204A-1204E are supported by radial segments 202A-202E. The overall diameter of the resonator can be varied depending upon the performance requirements. For example, a 16 mm diameter resonator can provide relatively high machining precision and low noise. Further refinement of the resonator can yield a resonator diameter of only 4 mm at significantly reduced cost.

Figure 2B:
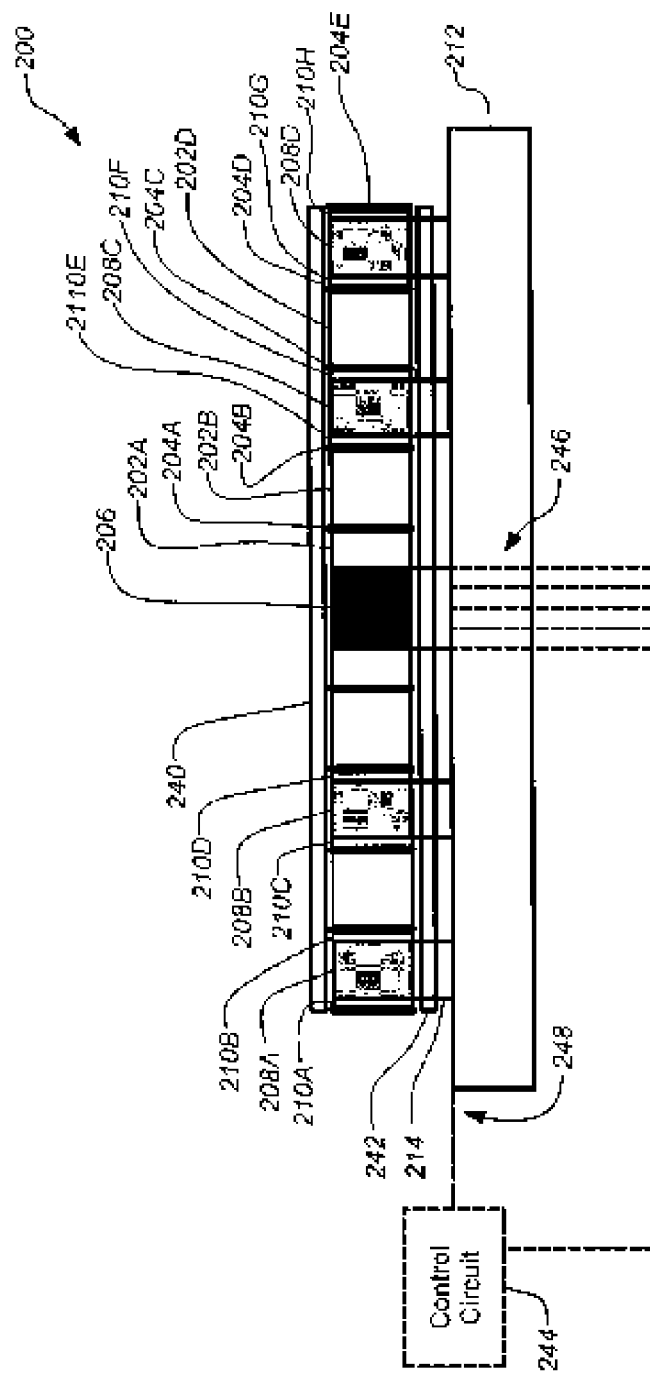
FIG. 2B is a schematic illustration of a side view of the exemplary planar resonator gyroscope of FIG. 2A.

FIG. 2B is a schematic illustration of a side view of the exemplary planar resonator gyroscope of FIG. 2A. Referring to FIG. 2B, the central support 206 supports the resonator 200 on the baseplate 212. At least some of the slots 216 in the resonator 200 provide access for the embedded electrodes 208A-208D which are also supported on pillars 214 on the baseplate 212. The electrodes 208A-208D form capacitive gaps 210A-210H (outboard gaps 210A, 210C, 210F and 210H and inboard gaps 210B, 210D, 210E and 210G) with at least some of the circumferential segments 204A-204E of the resonator 200. These electrodes 208A-208D provide for radial excitation of the resonator 200 as well as sensing motion of the resonator 200. To facilitate this each of the electrodes 208A-208D is divided into multiple separate elements to improve control and sensing of the resonator. For example, the annular electrode 208B as shown can be divided into two or more elements, at least one element acting across the outboard gap 210C and at least one acting across the inboard gap 210D. Vibration is induced in the resonator by separately exciting the elements to produce a biased reaction on the resonator 200 at the electrode 208B location.

In general, the excitation electrodes 208B, 208C are disposed closer to the central support 206 (i.e., within inner slots of the resonator 200) than the electrodes 208A, 208D (i.e. within outer slots of the resonator 200) to improve sensing. However, the arrangement and distribution of the excitation and sensing electrodes 208A-208D can be varied as desired. In further embodiments, additional electrodes can also be used to bias the resonator 200 providing electrostatic tuning or trimming of nonuniformity. Such biasing electrodes can also include multiple separate elements as the excitation and sensing electrodes.

One or more additional electrodes 240, 242 may be disposed adjacent to the planar resonator 200. Although the electrodes 240, 242 are shown as single elements above and below the planar resonator 200, each electrode may comprise multiple distinct elements which may be independently controlled. The upper electrode 240 may be disposed on the inner surface of a housing (not shown in FIG. 2B) enclosing the resonator while the lower electrode 242 may be disposed on the baseplate 212. The lower electrode 242 is limited to the available area between the embedded electrodes 208A-208D and the rigid central support 206. The additional electrodes 240, 242 may be used to enhance control of the planar resonator 200. These capacitance electrodes 240, 242 may be used for axial or angular acceleration measurement as well as active damping of the axial and rocking modes of the disc resonator gyroscope.

Operation of the planar resonator 200, e.g. as part of a gyroscope, will be described with respect to FIG. 3 below. In general, the various electrodes (embedded in the resonator or adjacent to it) are used to drive vibration modes of the planar resonator as well as sense reactions in those modes to movement of the resonator with a control circuit 244 coupled to each electrode. Electrical connections to couple all the electrodes to the control circuit may be routed in any manner. For example, electrical connections may be provided by etched conductive traces on the surface of the baseplate 212 to wirebonds 248 from one edge of the baseplate 212. Alternately (or in addition) one or more of the electrical connections may be routed through vertical vias 246 through a central region of the baseplate 212. The design of the control circuit 244 may be readily developed by those skilled in the art in accordance with the teaching herein.

Figure 2C:
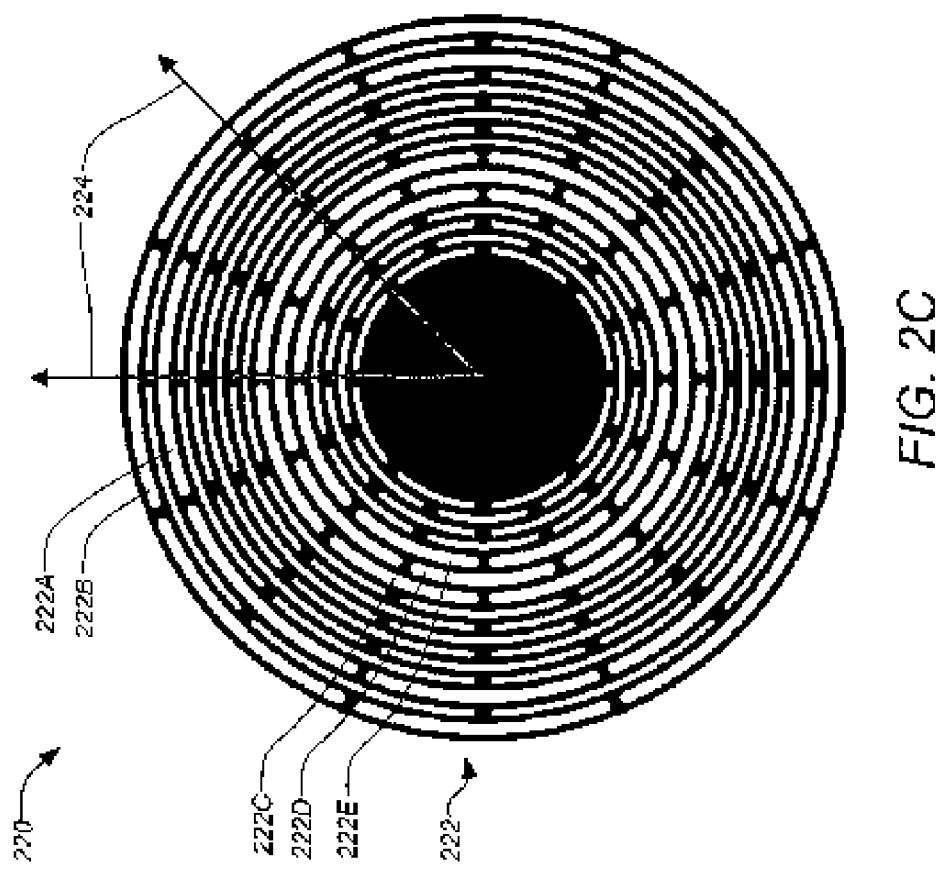
FIG. 2C illustrates a pattern for an exemplary planar resonator structure in accordance with some embodiments.

FIG. 2C illustrates a pattern for an exemplary planar resonator structure in accordance with some embodiments. The pattern 220 employs numerous concentric interleaved circumferential slots 222. Some of the slots, e.g. 222A-222E are wider to accommodate multiple element electrodes. For example, two of the outer rings of wider slots 222A, 222B are for the sensing electrodes and three of the inner rings of wider slots are for the driving electrodes. The remaining slots 222 can serve to structurally tune the resonator 200 (e.g., lower the frequency) and/or they may be occupied by bias electrodes which are used to actively bias the resonator in operation. The resonator and modal axes 224 are indicated; operation of the resonator identifies them because the pattern 220 is symmetric.

Although the exemplary resonator 200 is shown as a disc, other planar shapes and geometries using internal sensing and actuation with embedded electrodes are also possible applying principles of the present invention. In addition, furthermore, the single central support 206 is desirable, providing complete isolation of the resonator, however, other mounting configurations using one or more additional mounting supports are also possible.

As employed in the resonator 200 described above, a centrally supported solid cylinder or disc has two degenerate in-plane radial modes suitable for Coriolis sensing, however the frequencies are very high (greater than 100 KHz) and the radial capacitance sensing area diminishes with cylinder height or disc thickness. However, the multi-slotted disc resonator 200, shown in FIGS. 2A and 2B overcomes these problems. By etching multiple annular slots through the cylinder or disc two immediate benefits result: two degenerate modes suitable for Coriolis sensing with low frequency (less than 50 KHz) and large sense, bias and drive capacitance. The low frequency derives from the increased radial compliance provided by the slots. The large sense, bias and drive capacitance is a consequence of the large number of slots that can be machined into the resonator.

Figure 2D:
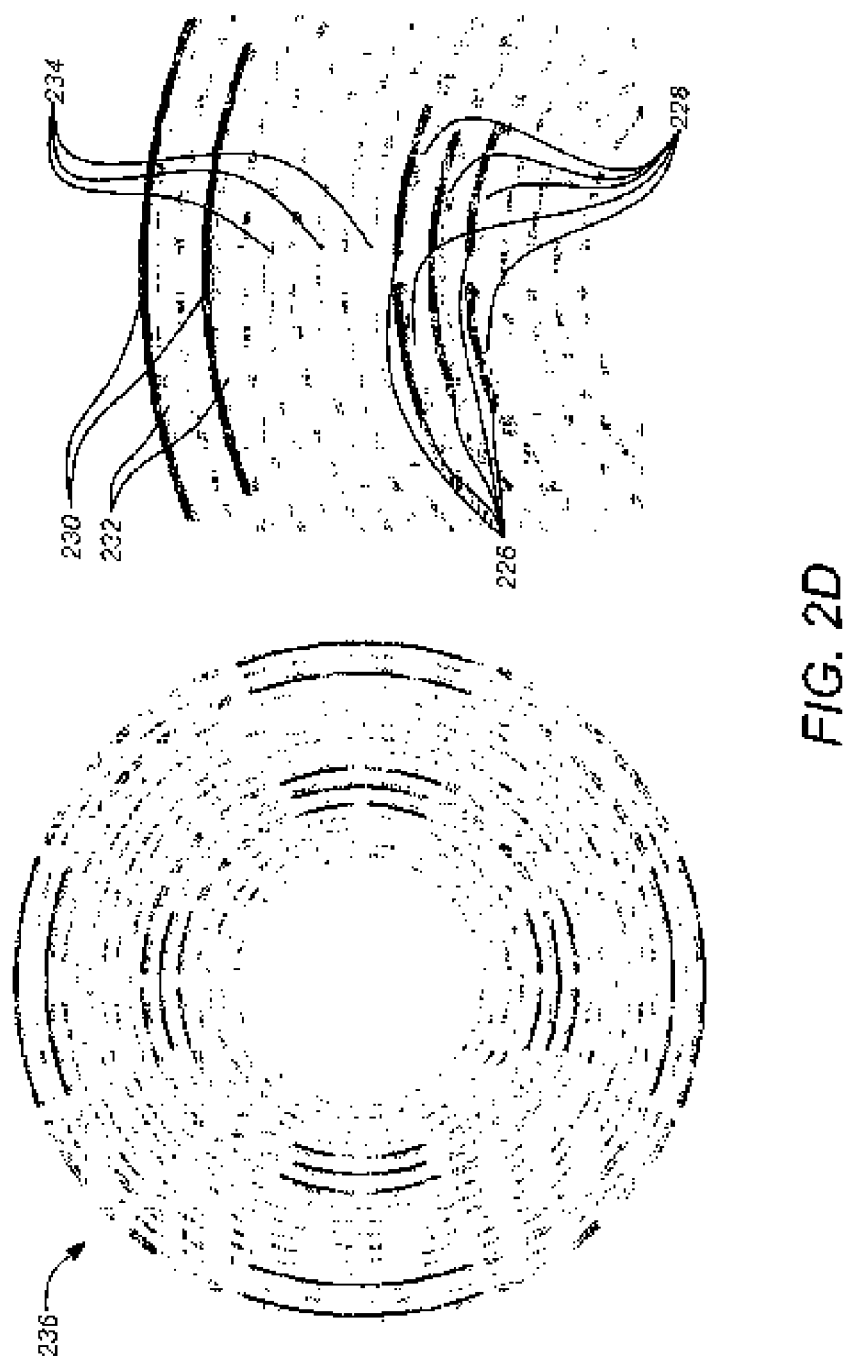
FIG. 2D is a schematic illustration of a conventional electrode operation for a first differential mode of the exemplary resonator in accordance with some embodiments.

FIG. 2D is a schematic illustration of a conventional electrode operation for a first differential mode of the exemplary resonator in accordance with some embodiments. The electrodes 136 that operate with a resonator 200 of the pattern 220 are shown in the left image. Four groups of electrodes 224 are used, each at a 90° interval around the circumference of the pattern. The negative excitation elements 226 and positive excitation elements 228, paired elements of the excitation electrodes, are driven to excite the resonator 200. These paired elements 226, 228 share a slot with the negative elements 226 in the outboard position and the positive elements 228 in the inboard position. Note also that as shown some of the pairs share a common slot with other distinct electrode pairs, illustrating that multiple separately operable electrodes can share a common resonator slot. The sensing electrodes are disposed at a larger radial position and include negative sensing elements 230 and positive sensing elements 232 which together provide output regarding motion of the resonator 200.

A uniform radial spacing between slots 216, 222 can be employed, but other spacing may also be used, provided two degenerate radial modes suitable for Coriolis sensing are maintained. In addition, in further embodiments, some or all of the segments 204A-204E can be further slotted such that a single beam segment is further divided into a composite segment including multiple parallel segments. Selective use of such composite segments can be used to adjust the frequency of the resonator as well as eliminate harmful thermoelastic effects on drift performance as the segments are stressed in operation of the resonator. Generally, adding slots to form composite circumferential segments lowers the resonator frequency. The effect of machining errors is also mitigated with multiple slots. Although such composite segments are preferably applied to the circumferential segments 204A-204E, the technique can also be applied to the radial segments 202A-202E or other designs with other segments in other resonator patterns.

Employing the in-plane design described may yield advantages over other out-of-plane gyros. For example, the central support bond carries no vibratory loads, eliminating any friction possibility or anchor loss variability. In addition, simultaneous photolithographic machining of the resonator and electrodes is achieved via the slots. Furthermore, diametral electrode capacitances can be summed to eliminate vibration rectification and axial vibration does not change capacitance to a first order. Modal symmetry is also largely determined by photolithographic symmetry not wafer thickness as with other designs. Isolation and optimization of sense capacitance (e.g., from the outer slots) and drive capacitance (e.g., from the inner slots) is achieved. Embodiments of the invention also achieve a geometric scalable design to smaller or larger diameters and thinner or thicker wafers. In addition, embodiments of the invention can be entirely defined by slots of the same width for machining uniformity and symmetry. Implementation of the present invention can also accommodate silicon anisotropy producing frequency splits. For example, a silicon wafer and/or a varied slot width can be used.

As mentioned above, high thermoelastic damping due to vibration frequency proximity to thermal relaxation resonance can result in short resonance decay times and high gyro drift. However, the slot radial spacing can be adjusted to define an optimum beam width and a number of slots can be additionally etched in between the slots defining the electrode gaps to further reduce the vibrating beam width.

Figure 3:
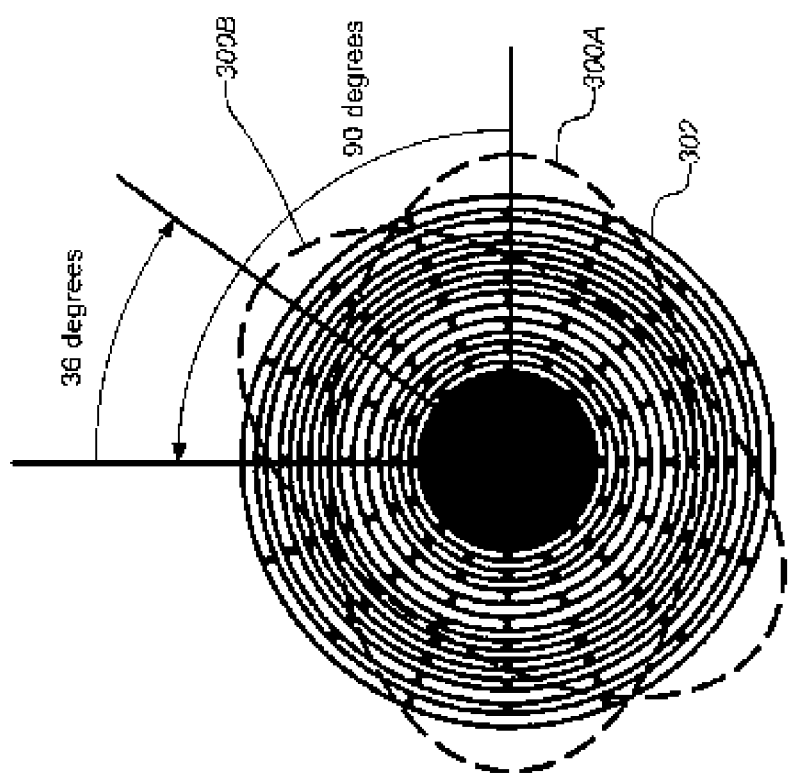
FIG. 3 is a schematic illustration of a principle of operation of an exemplary disc resonator gyroscope in accordance with some embodiments.

FIG. 3 illustrates the principle of operation of an exemplary disc resonator gyroscope (such as described in FIGS. 2A-2D). The mode is elliptically-shaped and reactionless relative to the rigid central support of the disc resonator 202. This mode is excited at a fixed vibration amplitude and when an inertial rotation is applied as shown in FIG. 3, its precession is observed via the segmented capacitive electrodes embedded within and adjacent to the interconnected rings that comprise the disc resonator 302 structure. The amount of precession is a precise geometrically-defined fraction of the inertial rotation. In the example shown, the standing wave vibration pattern is illustrated in a first position 300A before the case of the disc resonator 302 is rotated. As the case fixed to the centrally supported disc resonator 302 is rotated ninety degrees as indicated, the precession shifts the standing wave vibration pattern to the second position 300B (approximately thirty-six degrees clockwise in the example).

Generally, vibratory gyroscopes actively control at least one vibratory Coriolis mode to vibrate at constant amplitude. A second, nearby output Coriolis mode may be either actively forced to zero amplitude or allowed to freely vibrate in order to sense the Coriolis force produced by the combination of the first mode vibration and an input inertial rate along an axis normal to the plane of vibration. A closed loop force to rebalance the amplitude to zero or the open loop precession are indicative of the input inertial rate.

Figure 4:
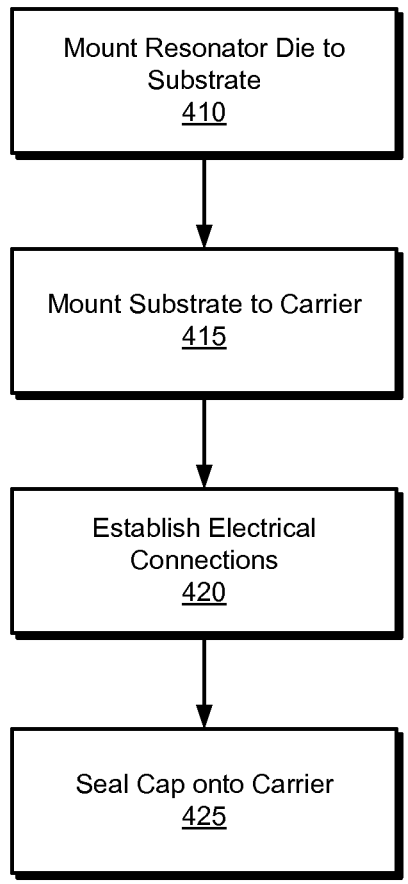
FIG. 4 is a flowchart illustrating operations in a method to make a gyroscope packaging assembly.

FIG. 4 is a flowchart illustrating operations in a method to make a gyroscope packaging assembly. Referring to FIG. 4, at operation 410 a resonator die comprising the resonator 120 and the baseplate 110 is mounted onto the substrate 130 to define a cavity 125 between the substrate 130 and the base plate 110, such that the resonator 120 is suspended in the cavity 125. At operation 415 substrate 130 is mounted to the carrier using either the hard-mount technique, or one or more solder balls or pillars, as describe above. At operation 420 one or more electrical connections are established between the baseplate 110, the substrate 130, and the lead wires 136. At operation 425 the cap 150 is set on the carrier 140. A vacuum may then be applied to the assembly 100, and the assembly 100 may be heated to flow the solder or cure the bonding material.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A packaged resonator gyroscope, comprising:
   a carrier;
   a substrate mounted on top of the carrier;
   a baseplate mounted on top of the substrate to define a cavity between the substrate and the baseplate; and
   a single disc resonator hanging from the baseplate by a rigid central support and suspended in the cavity between the substrate and the baseplate, the resonator comprising a plurality of circumferential segments disposed about the rigid central support to define a plurality of circumferential slots and a plurality of electrodes disposed in the plurality of circumferential slots, whereby the resonator can detect movement in multiple orientations.

2. The packaged resonator gyroscope of claim 1, wherein the substrate is mounted to the carrier by a hard mount.

3. The packaged resonator gyroscope of claim 1, wherein the substrate is mounted to the carrier by at least one solder ball.

4. The packaged resonator gyroscope of claim 3, wherein the at least one solder ball comprises a thermal pillar bump.

5. The packaged resonator gyroscope of claim 1, wherein the substrate is mounted to the carrier by at least one pillar.

6. The packaged resonator gyroscope of claim 1, wherein:
   the baseplate comprises at least a first electrical interconnect;
   the substrate comprises at least a second electrical interconnect; and
   the first electrical interconnect is coupled to the second electrical interconnect.

7. The packaged resonator gyroscope of claim 6, wherein the baseplate is electrically coupled to the first electrical interconnect via an electrically conductive solder ball.

8. The packaged resonator gyroscope of claim 1, wherein:
   at least a portion of the substrate is removed to define a plurality of cantilevered sections; and
   the baseplate is coupled to the substrate on at least one of the plurality of cantilevered sections.

9. The packaged resonator gyroscope of claim 1, further comprising a cap to enclose the resonator package.

10. The packaged resonator gyroscope of claim 9, further comprising a getter layer coupled to the cap.

11. The packaged resonator gyroscope of claim 1, further comprising a thermoelectric cooling module.

12. A method of packaging a planar resonator gyroscope, comprising:
   mounting a planar resonator die comprising a single disc planar resonator hanging from a baseplate by a rigid central support onto a substrate to define a cavity between the substrate and the baseplate, such that the resonator is suspended in the cavity between the substrate and the baseplate, the resonator comprising a plurality of circumferential segments disposed about the rigid central support to define a plurality of circumferential slots and a plurality of electrodes disposed in the plurality of circumferential slots, whereby the resonator can detect movement in multiple orientations;
   mounting the substrate to a carrier; and
   securing a cap to the carrier.

13. The method of claim 12, wherein mounting a planar resonator die comprising a planar resonator and a baseplate onto a substrate comprises establishing electrical connections between the baseplate and the substrate.

14. The method of claim 12, wherein mounting the substrate to a carrier comprises establishing a hard mount.

15. The method of claim 12, wherein mounting the substrate to a carrier comprises securing the substrate to the carrier using at least one solder ball.

16. The method of claim 12, wherein mounting the substrate to a carrier comprises securing the substrate to the carrier using at least one pillar.

17. The method of claim 16, further comprising establishing an electrical connection between the substrate and at least one lead wire.

18. The method of claim 12, wherein:
   at least a portion of the substrate is removed to define a plurality of cantilevered sections; and
   the baseplate is coupled to the substrate on at least one of the plurality of cantilevered sections.

19. The method of claim 12, wherein, further comprising securing a getter layer to the cap.

* * * * *